Figure 1:
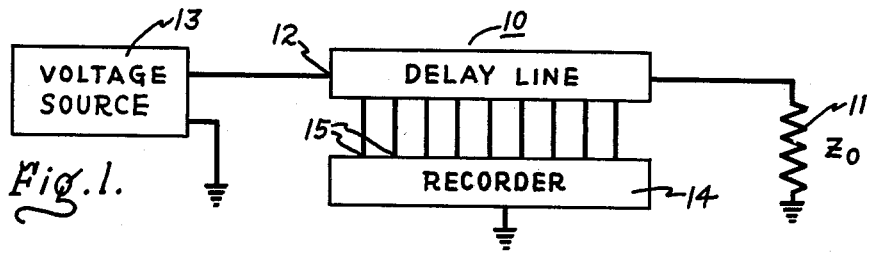

May 8, 1962  J. G. ANDERSON  3,034,124
SURGE VOLTAGE RECORDER
Filed Oct. 29, 1957  3 Sheets-Sheet 1

Inventor,
John G. Anderson,
by Gilbert P. Tarlton
His Attorney.

May 8, 1962

J. G. ANDERSON 3,034,124

SURGE VOLTAGE RECORDER

Filed Oct. 29, 1957

3 Sheets-Sheet 2

Inventor,
John G. Anderson,
by Gilbert P. Tarleton
His Attorney.

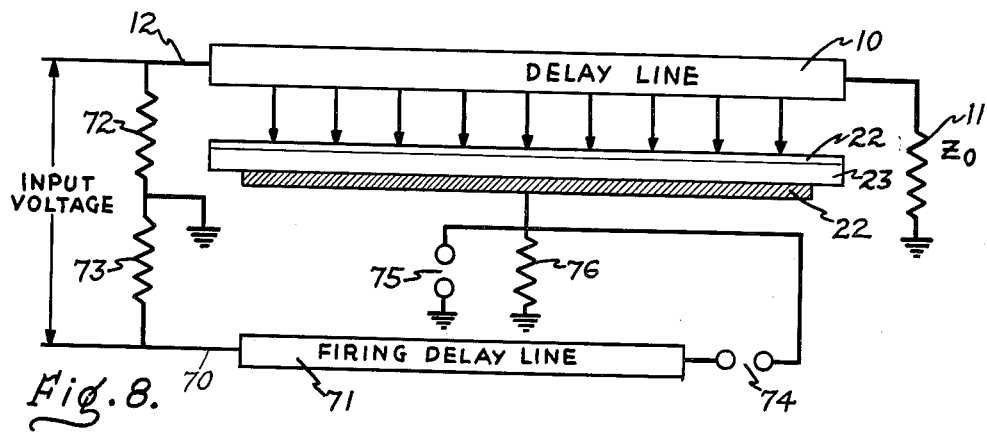
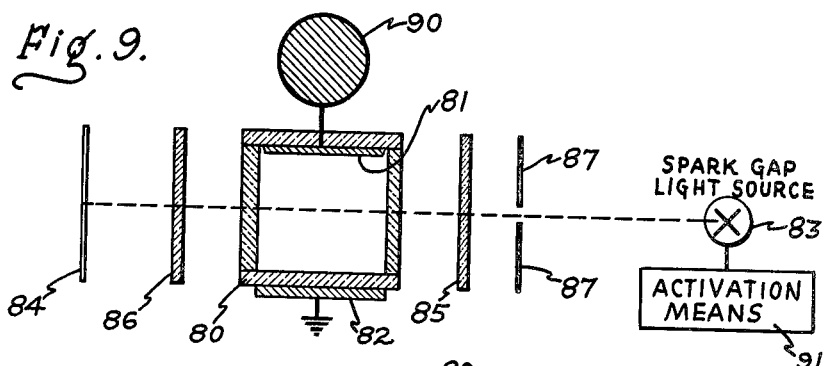
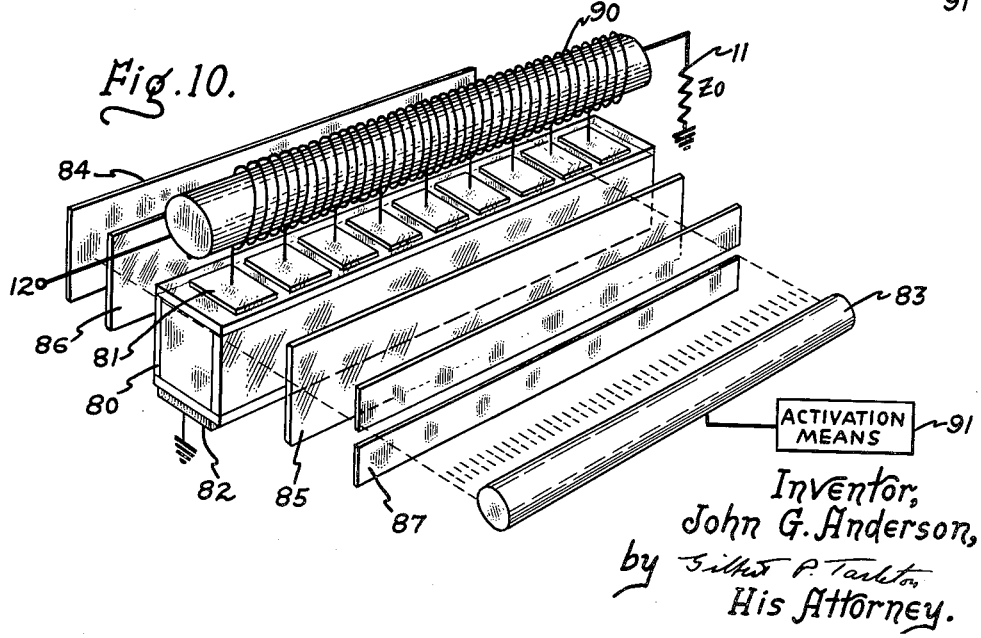

United States Patent Office 3,034,124
Patented May 8, 1962

3,034,124
SURGE VOLTAGE RECORDER
John G. Anderson, Dalton, Mass., assignor to General
Electric Company, a corporation of New York
Filed Oct. 29, 1957, Ser. No. 693,166
11 Claims. (Cl. 346—74)

This invention relates to the measurement of electrical quantities, and more in particular to an improved apparatus for recording the magnitude and wave shape of transient voltages.

For the purpose of designing electrical equipment it is desirable to know the various conditions to which the equipment will be subject while in service. Determination of the conditions normally presents no great problem when its occurrence is frequent, but when the occurrence of the condition is infrequent it is not easy to determine its exact nature. For example, it is desirable to provide means for obtaining field data on the magnitude and wave shape of random high voltage and current surges to which an electrical apparatus may be subject in service. The surges may arise for example from such causes as lighting or switching. Up to the present time this type of information has been obtained only with difficulty since it required the continuous employment of expensive equipment (such as oscillographs) and trained operators to record phenomena that were frequently so random that no information whatsoever might be collected for months or even years. As a result, in many cases it was not economically feasible to attempt to collect such data.

It is therefore an object of this invention to provide improved apparatus for determining and recording the magnitude and wave shape of electrical quantities.

Still another object of this invention is to provide an economical means for recording wave shape and magnitude of infrequently occurring transient electrical quantities, the means being characterized by having no moving parts, and requiring no power supply.

Briefly stated, in accordance with one aspect of my invention, I provide means comprising an electrical delay line for recording the wave shape of a voltage. I also provide a recording means adapted to be actuated by voltage pulses the delay line being connected to the recording means at a plurality of points. In order to simultaneously record the voltage at all points on the recording means, I provide delay means which is actuated by the transient voltage to energize the recording means at a predetermined time.

In one embodiment of my invention, the delay line is connected to a sensitized dielectric plate at a plurality of points. A delay means actuated by the transient voltage provides a voltage pulse of opposite polarity to the dielectric plate at a predetermined time after the transient signal has been initiated. The pulse actuates the dielectric plate so that a discharge pattern such as a Lichtenberg figure appears upon the plate at each point where the delay line is connected thereto. The series of Lichtenberg figures thereby produced have magnitudes depending upon the amplitude of the transient voltage of the different points along the delay line, and therefore a curve joining the Lichtenberg figures gives an indication of the magnitude and wave shape of the transient voltage.

In another embodiment of my invention, the delay line is connected to a plurality of electrodes in a Kerr cell and delay means are provided to actuate a light source directed through the Kerr cell. Polarized plates are placed on opposite sides of the cell, and a photographic plate is placed on the opposite side of the cell as the light source. Actuation of the light source results in exposure of the different portions of the photographic plate according to the magnitude and wave shape of the transient voltage appearing at the electrodes.

The apparatus of my invention is capable of recording the wave shape and amplitude of single transient voltages ranging from a few microseconds in duration to many milliseconds with reasonable accuracy. No tubes, cathode-ray devices, or other such electronic components are required for its operation and in one form, as will be disclosed in more detail in the following paragraphs, the apparatus needs no photographic film or other light sensitive device to make a permanent record of the transient information. The device is inexpensive to manufacture, easily adjusted and serviced, and requires a minimum of attention. This latter feature enables its use at locations where the transient voltages it is desirable to measure occur extremely unfrequently. The apparatus is also self-energizing, and thereby requires no external power supply. In the basic form of my invention, as will be disclosed in the following paragraphs, the apparatus is completely static, and requires no movement of parts that may tend to decrease the reliability.

While the specification concludes with claims particularly pointing out and distinctly claiming the subject matter which I regard as my invention, it is believed that the invention will be better understood from the following description taken in connection with the accompanying drawings.

Figure 2:
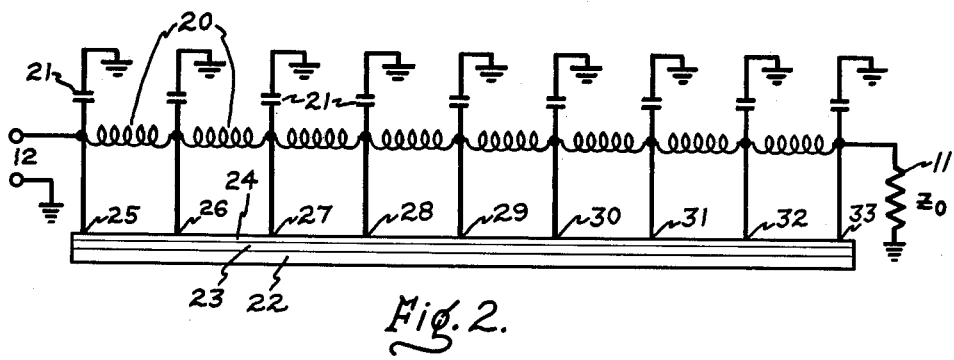
Figure 3A:
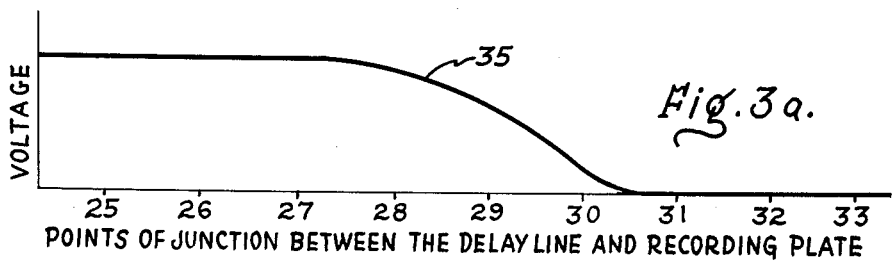
Figure 3B:
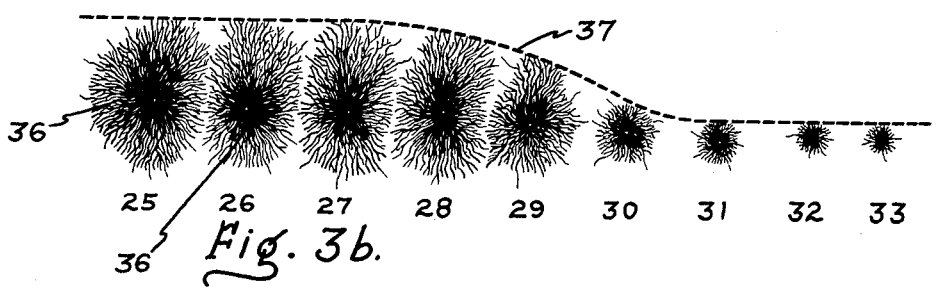

In the drawings:

FIG. 1 is a block diagram of a portion of surge voltage recorder according to my invention, FIG. 2 is a circuit diagram of one embodiment of a portion of a surge voltage recorder of my invention, FIG. 3a is an illustration of a voltage waveform, and FIG. 3b illustrates the discharge pattern that will appear on the recording plate of FIG. 2 in response to a voltage having the waveform of FIG. 3A.

Figure 4:
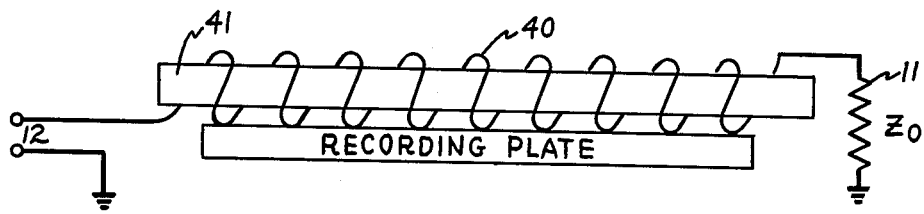
Figure 5:
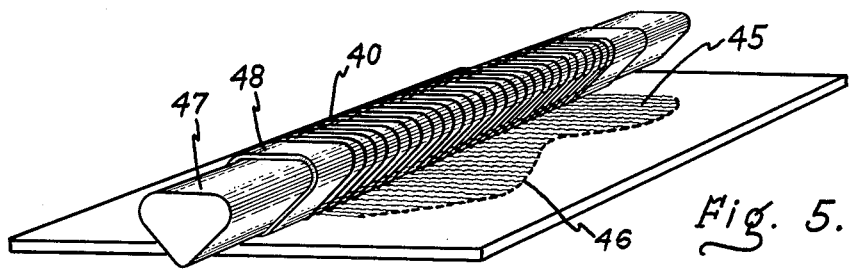
Figure 6:
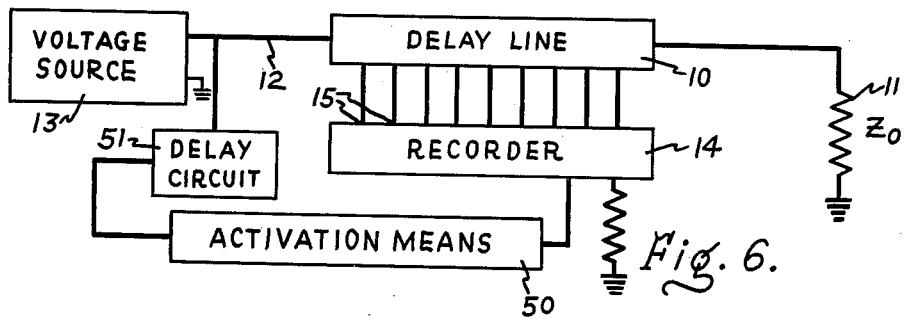
Figure 7:
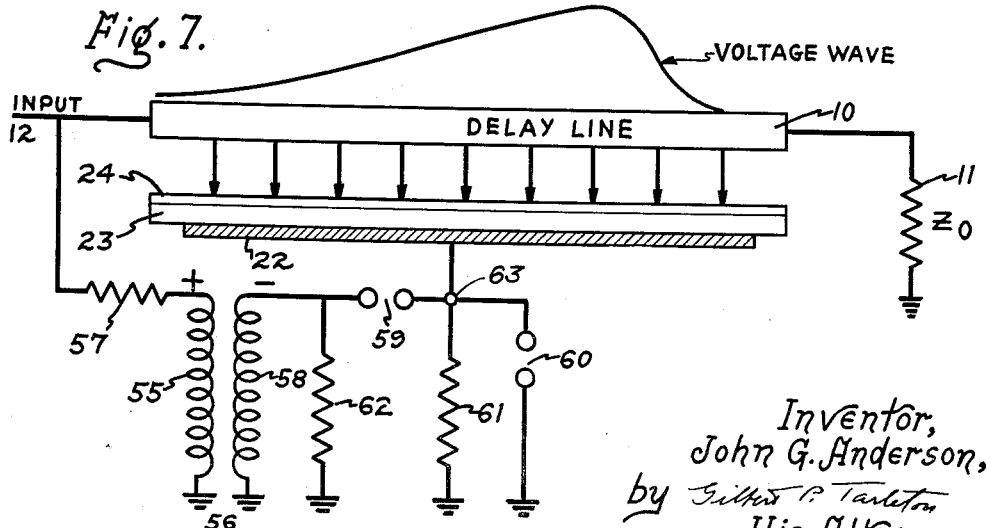

FIG. 4 is a circuit diagram of another embodiment of a portion of the surge voltage recorder of my invention, FIG. 5 is a perspective view of a preferred construction of a delay line of FIG. 4 and illustrating the type of discharge pattern appearing on the recording plate when employing this type of delay line, FIG. 6 is a block diagram of a complete arrangement of a surge voltage recorder according to my invention, FIG. 7 is a circuit diagram of one arrangement that may be employed in the surge voltage recorder of FIG. 6, FIG. 8 is a circuit diagram of another arrangement that may be employed in the surge voltage recorder of FIG. 6, FIG. 9 is a cross sectional view of the delay line and recording means of another form of the surge voltage recorder of my invention and FIG. 10 is a perspective view of the delay line and record-means of FIG. 9.

Referring now to the drawings, and more in particular to FIG. 1, therein is shown a block diagram illustrating a delay line 10 terminated in a characteristic impedance 11, the input end 12 of the delay line being connected to a voltage source 13. A recording means 14 which may be any of a number of types such as will be disclosed in more detail in the following paragraphs, is connected at a plurality of points 15 to the delay line.

In one form of my invention, as illustrated in FIG. 2, the delay line is of the "lumped constant" type comprising a plurality of series inductances 20 and parallel capacitances 21. The values of the components of the delay line may, of course, be selected to provide any desirable delay, depending upon the wave form to be recorded. In the form of my invention illustrated in FIG.

2, the recording means comprises a metallic plate 22 contacting the bottom of a dielectric plate 23 coated on its top with a layer 24 of a material that forms a discharge pattern in the presence of a voltage. The material 24, may, for example, be a photographic film, dust, or other media that leaves a permanent or semi-permanent record of the electrical discharge pattern, such as a layer of silicone grease as disclosed in copending application serial No. 692,222 filed October 24, 1957 by J. G. Anderson and D. C. Shampang and assigned to the assignee of the present invention. The layer of discharge forming material 24 is connected at a plurality of linear spaced apart points 25–33 to the delay line.

It will be obvious, of course, that the specific number of contact points herein shown is for the sake of illustration only, and that any desired number of such points may be employed without departing from the spirit and scope of the invention.

When a transient voltage wave is impressed on the delay line of FIGURE 2, the wave advances along the line, and the voltage appearing at any point on the line depends upon the delay of the line, and the magnitude and shape of the voltage wave.

In the illustrated example of FIGURE 3a, when a voltage wave having a shape of curve 35 has advanced along the line a predetermined time, the voltages (with reference to ground reference potential) appearing at the points 25 to 33 are equal to the voltage amplitudes at the respective points on the delay line. If the recording plate is arranged to record only voltages at that instant, the representation of the voltages will appear as a plurality of Lichtenberg patterns 36 having diameters proportional to the voltages at the points, as illustrated in FIGURE 3b. The wave shape and magnitude of the applied voltage wave will then be indicated by a curve 37 joining the patterns.

No pattern will be formed in the layer of sensitive material if the magnitude of the wave is less than a minimum voltage, e.g. about 5 kv. for photographic film or silicone grease.

The delay line, as illustrated in FIGURE 4, may also be of the distributed type, comprising a coil 40 of wire wound on an elongated insulating member 41. With this type of delay line the turns of the coil may contact the sensitive plate, thus facilitating the provision of a greater number of contact points between the plate and the delay line. A much finer resolution of the wave shape is also provided by this type of delay line, as illustrated in FIGURE 5 wherein is shown a typical discharge pattern provided by a distributed delay line. The pattern comprises a plurality of substantially parallel Lichtenberg streamers 45 emanating from the points of contact between the line and the plate. A curve 46 joining the ends of the streamers 45 defines the wave shape of the voltage wave applied to the line.

In order to provide sharper points of contact between the curves and the delay line and the sensitive plate, it is preferred that the delay line have a triangular cross section with one of the edges contacting the plate. Thus, as illustrated in FIGURE 5, the delay line comprises a triangular cross section insulating member, such as polystyrene, provided with a layer 48 of conducting material. The coil 40 is wound over and insulated from layer of conducting material 48. The delay of the distributed delay lines of FIGURES 4 and 5 may be increased by providing external capacitors in parallel with the line at a plurality of points.

As has been previously stated, a minmum voltage is required at the points of contact between the delay line and the sensitive plate in order that a discharge pattern be formed. If the line is continuously sensitive, and a wave form having a peak magnitude greater than this minimum value is impressed on the line, the resultant curve recorded by the device will be a straight line, since the peak of the wave form will provide the same discharge pattern at each point on the line. If no portion of the applied wave form is greater than the minimum voltage needed to form a pattern, then of course no pattern will occur.

Referring now to the block diagram of FIG. 6, activation means 50 have been provided connected to the recorder 14, and a delay circuit 51 has been connected to the input end 12 of the delay line in order to energize the activation means at predetermined time after the wave form has been applied to the delay line. The activation means 50 provides a surge voltage on the recorder of opposite polarity to the wave applied to the delay line 10. If the voltage pulse is substantially equal to or greater than the minimum voltage required to form a pattern, then a discharge pattern will be formed at each point on the recorder at an instant determined by the characteristics of the delay circuit.

Referring now to FIG. 7, the primary winding 55 of a pulse transformer 56 is connected by way of a resistor 57 to the input 12 of the delay line. The secondary winding 58 of the pulse transformer 57 is connected in series with gaps 59 and 60, the side of the gap 60 connected to the secondary winding 58 being at ground with its potential of the system. A resistor 61 is connected in parallel with the gap 60, and a resistor 62 may be connected in parallel with the secondary winding 58 of the pulse transformer. The junction 63 between the gaps 59 and 60 is connected to the conducting plate 22. The windings of the transformer 56 are arranged so that the voltage obtained at the gap 59 is of opposite polarity to the voltage of the input 12 of the delay line.

As a voltage wave moves along the delay line, various potentials appear between the points of contact between the delay line and recording point. If the peak of each of the incoming waves is not much greater than about 5 kv., the Lichtenberg figures forming along the points will be small. The incoming wave is also impressed on the resistor 57 and the primary winding 55 of the transformer 56. The transformer 56 should not have a rapid response, since a time delay is required in this circuit. The value of the resistance 57 is adjusted so that the voltage across the resistor 62 rises to the desired amplitude to effect the spark over of the gap 59. Thus, the transformer 56 serves primarily as a surge polarity inverter and time delay device.

After the voltage surge has moved along the delay line 10 for a predetermined distance, the load voltage across the gap 59 increases until the gap sparks over, for example, at about 15 kv. This immediately impresses a 15 kv. voltage across the resistor 61 and a voltage of about 15 kv. appears between the conducting plate 22 and ground reference potential. Since this voltage is of opposite polarity to the potentials of the points of contact between the delay 19 and the recording plate, the potentials between the points in the conducting plate now are suddenly increased by about 15 kv. Lichtenberg figures are formed on the sensitive material and the figure diameters are proportional to the total plate to point voltage. A fraction of a microsecond later, the gap 60 sparks over, restoring the conducting plate to ground potential, and the Lichtenberg figures either cease to form or are greatly reduced in size, thereby not interferring with the figures formed while the surge was applied to the conducting plate. The gaps 59 and 60 must, of course, be spaced to spark-over at the desired voltage, and the gap 60 should spark over at a lower voltage than the gap 59.

In order to obtain a more fixed firing time for activating the recording means, the time delay may be provided by another delay line. Thus, in FIG. 8, the input voltage to the surge voltage recorder of my invention is applied between the input end 12 of the delay line 10 and the input end 70 of a delay line 71. Resistors 72 and 73 are provided connected serially between the input ends of the two delay lines, the junction between the resistors 72 and 73 being connected to ground reference potential. The other end of the firing delay line 71 is connected to ground reference potential by way of serially connected gaps 74 and 75. The junction between the gaps 74 and 75 is connected to the conducting plate 22 and to ground reference potential by way of resistance 76. The resistors 72 and 73 preferably have the same value.

In the arrangement of FIG. 8, equal and opposite voltages are applied to the two delay lines (with respect to the potential) since the resistors 72 and 73 have the same value, and the firing delay line 71 is designed so that its delay is less than the delay of the delay line 10. When the surge traveling along the firing delay line 71 reaches the gap 74, the voltage tends to double according to normal transmission line behaviour, and the gap 74 sparks over placing a definite potential across the resistor 76 determined by the spacing of the gap 74. This sudden increase in point to plate potential in the recorder initiates the formation of Lichtenberg figures as in the arrangement of FIGURE 7. Then the gap 75 sparks over, within preferably less than a microsecond, and reduces the recording plate potential to zero. The Lichtenberg figures then either cease to form or greatly reduce, leaving behind the Lichtenberg figure pattern which corresponds to the sum of the delay line voltages and the known trigger voltage at the instant the gaps fired. From these patterns the wave shape is easily deduced.

In the modification of my invention illustrated in FIGURES 9 and 10, I provide an elongated Kerr cell 80 have a plurality of coplanar spaced apart electrodes 81. An elongated electrode 82 is provided parallel to the plane of the electrodes 81 and substantially uniformly spaced from electrodes 81. A liquid having a Kerr constant, such as nitrobenzene or carbon disulphide, is provided in the cell separating the electrodes 81 from the electrode 80. A light source 83, such as an argon gap is provided on one side of the cell and is arranged so that light originating from the source 83 passes through the transparent walls of the Kerr cell 80 to a photosensitive plate or film 84 disposed on the opposite side of the cell. The beam of light is intercepted by a polarizer 85 on the side of the cell toward the light source, and an analyzer 86 on the side of the cell toward the plate 84. The beam of light may be passed through a slit 87 before it reaches the polarizer 85. A delay line, such as a distributed line 90 is connected at a plurality of points to the electrodes 81. The conducting plate 82 is connected to ground reference, and the delay line 90 is terminated in the characteristic impedance 11.

In the modification of my invention illustrated in FIGS. 9 and 10, an activation means 91 such as the firing means previously disclosed, is arranged to momentarily energize the light source after the voltage wave has traversed a portion of the delay line. The amount of light passing through the Kerr cell and then striking the photo sensitive plate is governed by the voltage at that instant between the electrodes 81 and the electrode 82. The light passing through the Kerr cell results in exposure of the photographic film or plate along its length by an amount determined by the delay line voltage across the cell at each electrode 81. The resultant fogging of the film may then be measured, for example by a microdensitometer, and the measurement translated into voltage magnitudes. In order to increase the definition of the pattern that is produced on the photo sensitive plate, it is desirable that a considerable number of electrodes 81 be provided in this cell. Movement of the slit 87 or light source 83 permits the production of a series of records on the film or plate without superposition.

It will be understood, of course, that, while the forms of my invention herein shown and described constitute preferred embodiments of my invention, it is not intended herein to illustrate all of the possible equivalent forms or modifications thereof. It will also be understood that the words used are words of description rather than of limitation, and that various changes may be made without departing from the spirit or scope of the invention herein disclosed, and it is aimed in the appended claims to cover all such changes as fall within the true spirit and scope of my invention.

What I claim as new and desire to secure by Letters Patent of the United States is:

1. Means for recording the wave shape of a voltage comprising a delay line, means including a stationary medium for recording the voltage that appears at a plurality of points along said line, and delay means actuated by a voltage applied to said delay line to simultaneously effect the recording at each of said points at a predetermined time after said wave has been applied to said delay line.

2. Means for recording the wave shape of a voltage comprising a multi-tap delay line, elongated stationary recording means having a response variable with voltage magnitude at a plurality of positions, said positions on said recording means being connected to the taps of said delay line, and delay means actuated by said voltage for energizing said recording means to simultaneously record the magnitude of voltage at each position at a predetermined time after said wave have been applied to said delay line.

3. Means for recording the wave shape of a transient voltage comprising a multi-tap delay line terminated by a characteristic impedance, elongated stationary recording means having a response variable with the magnitude of voltage applied thereto at a plurality of positions, successive taps of said delay line being connected to successive positions of said recording means, and delay means actuated by said transient voltage, said delay means being connected to said recording means to energize said recording means so that a permanent record is made thereon of the magnitude of voltage present at each of said positions a predetermined time after said delay line is energized by said transient voltage.

4. Means for recording the wave shape of a voltage comprising a multi-tap delay line, dielectric plate means, a layer of discharge pattern forming material on one side of said plate means, conducting means on the other side of said plate means, the taps of said line being connected to said layer at a plurality of spaced apart points, and delay means actuated by said voltage to provide a voltage pulse on said conducting means opposite in polarity to said voltage to simultaneously effect the recording at each of said points.

5. Means for recording the wave shape of a transient voltage comprising a multi-tap delay line having an input end connected to a source of transient voltages and terminated with a characteristic impedance, dielectric plate means, a layer of discharge pattern forming material on one side of said plate means, a conducting surface on the other side of said plate means, the taps of said delay line being connected to said layer at successive spaced apart points, and delay means actuated by a transient voltage applied to said line for providing a voltage pulse on said conducting surface, a predetermined time after the transient voltage is applied to said line to simultaneously effect the recording at each of said points, said voltage pulse having a polarity opposite that of the applied transient voltage.

6. The recording means of claim 5 in which said layer is a photographic film.

7. The recording means of claim 5 in which said layer is a silicone grease.

8. The recording means of claim 5 in which said line is a distributed delay line, and the taps comprise exposed conductors of the line that physically contact said layer.

9. Means for recording the wave shape of a transient voltage comprising a multi-tap delay line having an input end connected to a source of transient voltages and terminated with a characteristic impedance, dielectric plate means, a layer of discharge pattern forming material on one side of said plate means, a conducting surface on the other side of said plate means, the taps of said delay line being connected to said layer at successive spaced apart points, and delay means comprising a transformer having a primary winding connected to said input end and a secondary winding connected in series with first and second gaps, the junction of said gaps being connected to said conducting surface, the junction between said second gap and secondary winding being at the reference potential of said line, and a resistor in shunt with said second gap, said delay means aranged to provide a voltage pulse to said conducting surface opposite in polarity to said transient voltage.

10. Means for recording the wave shape of transient voltage comprising a multi-tap delay line having an input end connected to a source of transient voltages and terminated with a characteristic impedance, dielectric plate means, a layer of discharge pattern forming material on one side of said plate means, a conducting surface on the other side of said plate means, the taps of said delay line being connected to said layer at successive spaced apart points, and delay means comprising a second delay line having less delay than said first delay line, the input end of said second delay line being connected to said source, first gap means having one end connected to the other end of said second delay line, second gap means connected between the other end of said first gap means and the reference potential of said first delay line, the junction of said gap means being connected to said conducting surface, and resistance means in parallel with said second gap means, the input ends of said delay lines being connected to receive signals of opposite polarity.

11. Means for recording the wave shape of a transient voltage comprising a multi-tap delay line terminated by a characteristic impedance, a Kerr cell having plurality of coplanar spaced apart first electrodes, a second electrode parallel to said first electrodes and spaced substantially uniformly therefrom, successive first electrodes of said cell being connected to successive taps of said delay line, a source of light for said cell, and delay means actuated by said transient voltage for momentarily energized said source of light a predetermined time after said delay line is energized by said transient voltage.

References Cited in the file of this patent

UNITED STATES PATENTS

| | | |
|---|---|---|
| 1,649,180 | Peters | Nov. 15, 1927 |
| 1,702,412 | Peters | Feb. 19, 1929 |
| 1,742,115 | Whitaker et al. | Dec. 31, 1929 |
| 1,801,775 | Legg | Apr. 21, 1931 |
| 1,805,195 | Tanberg | May 12, 1931 |
| 2,467,202 | Gardiner | Apr. 12, 1949 |
| 2,561,345 | Deloraine | July 24, 1951 |
| 2,670,402 | Marks | Feb. 23, 1954 |
| 2,708,615 | Greenleaf et al. | May 17, 1955 |
| 2,739,865 | Willey | Mar. 27, 1956 |
| 2,858,181 | Ortlieb | Oct. 28, 1958 |

FOREIGN PATENTS

| | | |
|---|---|---|
| 280,231 | Great Britain | Apr. 26, 1928 |
| 795,348 | France | Mar. 11, 1936 |